United States Patent [19]

Mori et al.

[11] Patent Number: 5,587,771
[45] Date of Patent: Dec. 24, 1996

[54] IMAGE SAMPLING AND COLOR SHIFT CORRECTION SYSTEM IN MULTIPLE IMAGE FORMING APPARATUS

[75] Inventors: Hirotaka Mori; Ryo Ando, both of Kanagawa, Japan

[73] Assignee: Fuji Xerox Co., Ltd., Tokyo, Japan

[21] Appl. No.: 422,808

[22] Filed: Apr. 17, 1995

[30] Foreign Application Priority Data

Jun. 17, 1994 [JP] Japan .................... 6-135525

[51] Int. Cl.⁶ .................................... G03G 15/01
[52] U.S. Cl. .................. 355/208; 355/327; 347/116; 358/526
[58] Field of Search .................... 355/208, 271, 355/327; 358/526; 347/116, 234

[56] References Cited

U.S. PATENT DOCUMENTS

| 5,160,946 | 11/1992 | Hwang | 355/327 X |
| 5,241,400 | 8/1993 | Itagaki | 347/116 X |
| 5,373,355 | 12/1994 | Ando et al. | 355/327 |
| 5,404,202 | 4/1995 | Abramsohn | 355/208 |

*Primary Examiner*—Joan H. Pendegrass
*Assistant Examiner*—Sophia S. Chen
*Attorney, Agent, or Firm*—Finnegan, Henderson, Farabow, Garrett & Dunner, L.L.P.

[57] ABSTRACT

An image sampling and color shift correction system in a multiple image forming apparatus forms a multiple image by providing a plurality of image output units along a transfer belt. An image control unit applies image data to the image output units. A pattern generator repeatedly generates a register shift measurement pattern in the main scanning direction and the sub-scanning direction of the respective image output units. The register shift measurement pattern is formed outside of the largest paper area. A sampling unit samples an image formed by the respective image output units at both sides of a paper on the transfer belt in the main scanning direction of the transfer belt. A processing unit takes data sampled by the sampling unit and processes the amount of register shift. A control unit controls the image output and image sampling correction.

20 Claims, 7 Drawing Sheets

ERROR CONDITION

FIG. 2B

STEP 1
SKEW CORRCTION

FIG. 2C

STEP 2
MAGNIFICATION
CORRECTION

FIG. 2D

STEP 3
LATERAL DIRECTION
ERROR CORRECTION

FIG. 2E

STEP 5
PROCESS DIRECTION
ERROR CORRECTION
(FINE TUNNING)

IMAGE SAMPLING AND COLOR SHIFT CORRECTION SYSTEM IN MULTIPLE IMAGE FORMING APPARATUS

BACKGROUND OF THE INVENTION

1. Field of the Invention

The present invention relates to an image sampling and color shift correction system for preventing a shift of the transfer position of each color which is overlappedly transferred to a paper in a multiple image forming apparatus for forming a multiple image by providing a plurality of image output means along a transfer belt.

2. Description of the Related Art

Recently, the technology for coloring documents in a copy machine, a printer, a facsimile or the like has been rapidly advanced. These machines which deal with colored documents tend to have enhanced processing. An example of a machine with color processing of documents is a printer with four ROS (Raster Output Scanner), each with the colors black (K), yellow (Y), magenta (M), and cyan (C), i.e., a tandem color printer. However, since this tandem color printer uses a plurality of individual ROSes to form one image, when a user or a service man temporarily shifts a part of the image forming apparatus from the original image forming position to another position and then puts the parts back to the original position after fixing, for example, a paper jam or the like, and further, when the temperature has changed aged deterioration occurs, or something impacts on the apparatus, a subtle error occurs in the position relationships between the ROSes, photoreceptor drum and the transfer belt thereby resulting in the problem of the color shifting after the transfer of each color, i.e., register-shift occurs.

There are a shift component in the main scanning direction that the ROS scans, a shift component in the transfer belt carrying direction, i.e., in the sub scanning direction, and an angle shift component in the scanning direction of the ROS, i.e., a skew shift component or the like. Therefore, an image position recognition pattern predetermined by the respective ROSes is output from a pattern generator in accordance with a constant rule, the image position recognition pattern is transferred to the transfer belt and the pattern is sampled with a predetermined timing by change coupled devices (CCDs) disposed downstream of each image forming apparatus.

Figure 9:
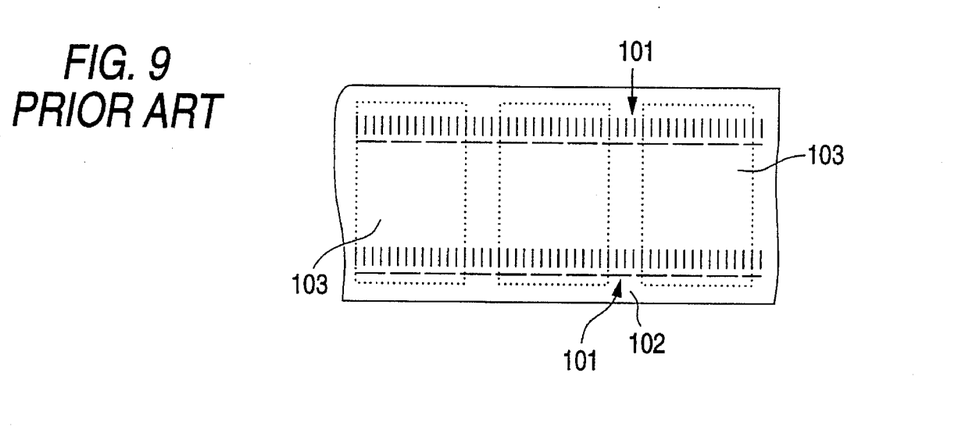
FIG. 9 is a view showing an example of a conventional register shift measurement pattern.

The CCDs sample the position of an image for respective colors. The difference between the sampled positions and the expected positions for a system with no color shifts of the image position recognition patterns for predetermined respective colors is detected, and the amount of the register shift of the respective colors is calculated from the detected data. A method for providing a little register shift and a high quality picture by correcting the ROS's write timing or the like in accordance with the calculated results is well known (for example, Japanese Patent Unexamined Publication (Kokai) No. 63-279272). However, in the above-mentioned conventional method, the register fitting cycle is differentiated from a usual job cycle and a register shift measurement pattern 101 is written in an image area 103 of a transfer belt 102, as shown in FIG. 9. Accordingly, there arise the following problems.

1) Since a special cycle is provided to correct the color shift, a time loss occurs.

2) Although a best color register state is obtained directly after the correction of the color shift, the color register state is gradually deteriorated for reasons of temperature change or the like after the correction.

3) A register shift due to an external force (for example, an impact or leaning) which cannot be detected by the machine cannot be timely found.

4) A check cycle in which the amount of the color shift is detected has a poor accuracy because of the low level of sensing. Therefore, if the picture quality and the color register have significantly deteriorated it is judged that the color shift is present, whereby a correction cycle is not executed. Consequently, the print is output as it is without the correction of the color shift, until a state occurs in which a color register shift is extensive.

SUMMARY OF THE INVENTION

Accordingly, the present invention has been made to solve the above-mentioned problems, and an object of the present invention is to provide a sampling and color correction system in a multiple image forming apparatus in which even in a usual print cycle, a sampling operation for correcting the register shift can be carried out at all times while keeping the cycle operation.

To attain the object, according to the present invention, there is provided an image sampling and color shift correction system in a multiple image forming apparatus for forming a multiple image by providing a plurality of image output units along a transfer belt.

An image control unit applies image data to the image output units. A pattern generator repeatedly generates a register shift measurement pattern in the main scanning direction and the sub-scanning direction of the respective image output units. The register shift measurement pattern is formed outside of the largest paper area. A sampling unit samples an image formed by the respective image output units at both sides of a paper on the transfer belt in the main scanning direction of the transfer belt. A processing unit takes data sampled by the sampling unit and processes the amount of register shift. A control unit controls the image output and image sampling correction.

According to the present invention, since a register shift pattern is formed at the outer side of the largest paper area which is allowed by the image forming apparatus, even in a usual print cycle, a sampling operation for correcting the register shift can be carried out at all times while keeping the cycle operation.

The above and other objects and features of the present invention will be more apparent from the following description taken in conjunction with the accompanying drawings.

DETAILED DESCRIPTION OF THE PREFERRED EMBODIMENTS

Figure 1A:
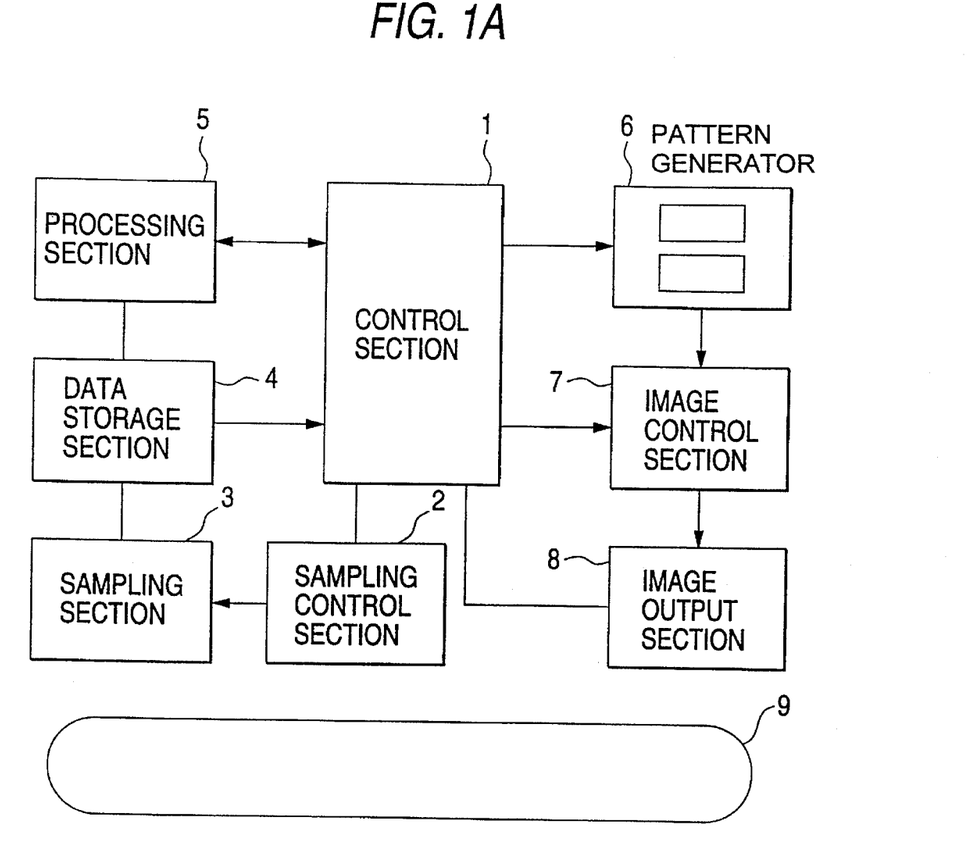
FIG. 1A is an entire constitutional view showing an image sampling and color shift correction system according to an embodiment of the present invention.
Figure 1B:
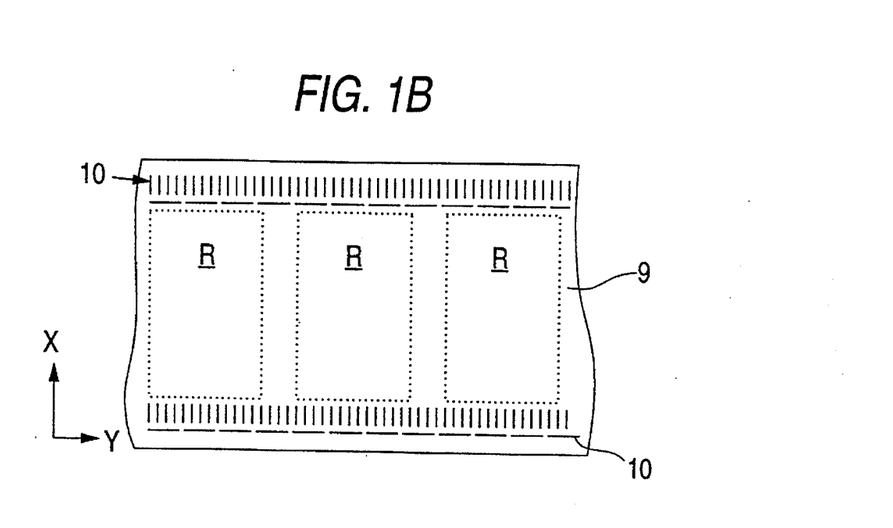
FIG. 1B is a view showing an example of a register shift measurement pattern.

Embodiments of the present invention will now be described with reference to the accompanying drawings. FIGS. 1A and 1B show an embodiment according to the present invention. Particularly, FIG. 1A is an entire constitutional view, FIG. 1B is a view showing an embodiment of a register shift measurement pattern.

In FIG. 1A, a transfer belt 9 is a belt shaped transfer member which transfers an image formed in an image output section 8. The image output section 8 disposes a plurality of image output means along the transfer belt 9 to form a multiple image. An image control section 7 supplies the image output section 8 with image data, based upon a signal received from pattern generator 6, to control image formation and repeatedly produce such patterns 10 as shown in FIG. 1B in the main scanning direction and the sub-scanning direction in the image output section.

A sampling section 3 includes, for example, a CCD line sensor that samples images formed on the transfer belt 9 at both sides in the main scanning direction. A sampling control section 2 controls the sampling start point and the sample width of the sampling section 3. A processing section 5 takes image data sampled by the sampling section 3, executes processing to calculate the amount of register shift, and stores the sampled data or the processing data in the data storage section 4. A control section 1 controls the image output and image sampling correction. When the control section 1 controls the image sampling correction, it sets a sampling start point and sample width of the sampling control section 2 to repeatedly produce register shift patterns and integrates the sampled data or processing data thereby obtaining a pattern position. After that, the control 1 detects register shift and controls the image control section 7 and the image output section 8 thereby controlling corrections such as skew correction, magnification correction, correction in the main scanning direction, and correction in the sub-scanning correction or the like.

In FIG. 1B, a register shift measurement pattern 10 is formed by the combination of line images having constant length in a direction X perpendicular to the progressing direction of the transfer belt 9, i.e., in the main scanning direction, and images having constant length in a progressing direction of the transfer belt 9, i.e., in the sub-scanning direction. The register shift measurement pattern 10 is formed so that K, Y, M and C are arrayed with a given gap, by combination of lines having a given length in the main scanning direction with lines having a given length in the sub-scanning direction. Therefore, the patterns are transferred to both sides of the transfer belt 9 in the main scanning direction X and formed at the outer side of the largest paper area allowed by the image forming apparatus. Therefore, the belt width of the transfer belt 9 becomes a little wide.

Figure 2A:
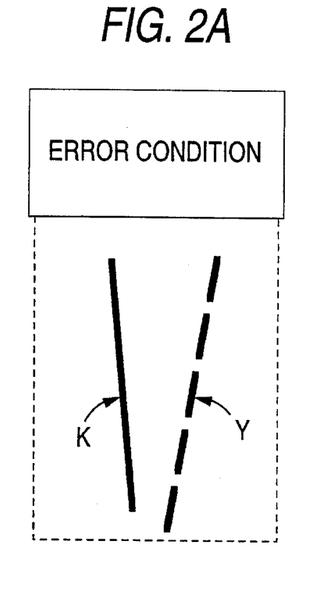
FIGS. 2A to 2E are views explaining the algorithm of a register shift correction according to the present invention.
Figure 2B:
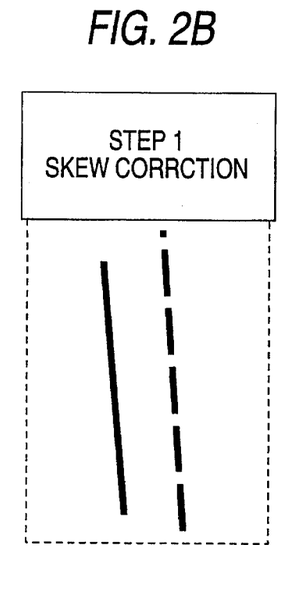
Figure 2C:
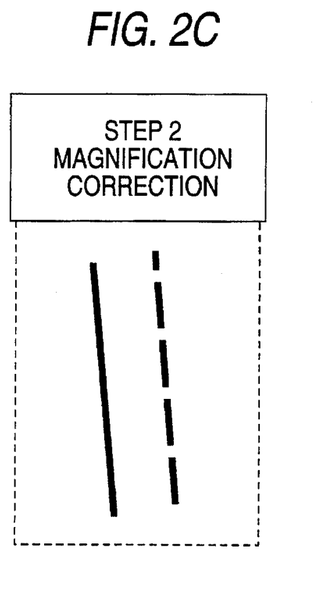
Figure 2D:
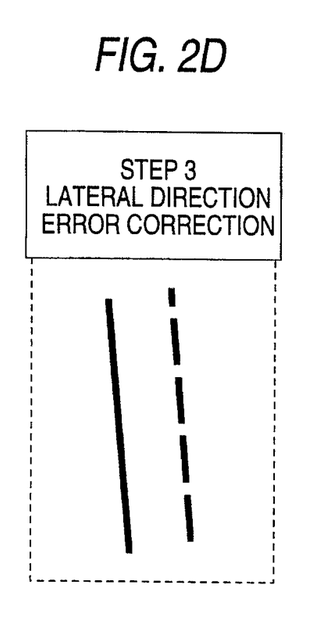
Figure 2E:
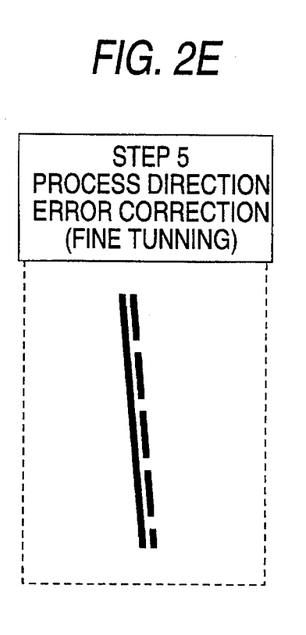

FIGS. 2A to 2E are views explaining the algorithm of register shift correction. The register shift correction is made by the following processes. When for example, a shift such as an image Y with respect to an image K exists as shown in FIG. 2A, a skew correction is made by correcting a mirror angle of the image K on the basis of the image K to fit the angle, as shown in FIG. 2B. After that, magnification correction is made by the control of clock frequency, thereby fitting the magnification in the main scanning direction as shown in FIG. 2C. Then the image Y is corrected in the main scanning direction by the controls of write clock timing and phase so that the image Y in the main scanning direction is fitted to the image K therein as shown in FIG. 2D, and the image Y in the sub-scanning correction is corrected by write timing correction of the Line Sync signal (Line feed signal) and polygon phase correction, as shown in FIG. 2E, thereby finally correcting the image Y to that within a permissible error.

Figure 3:
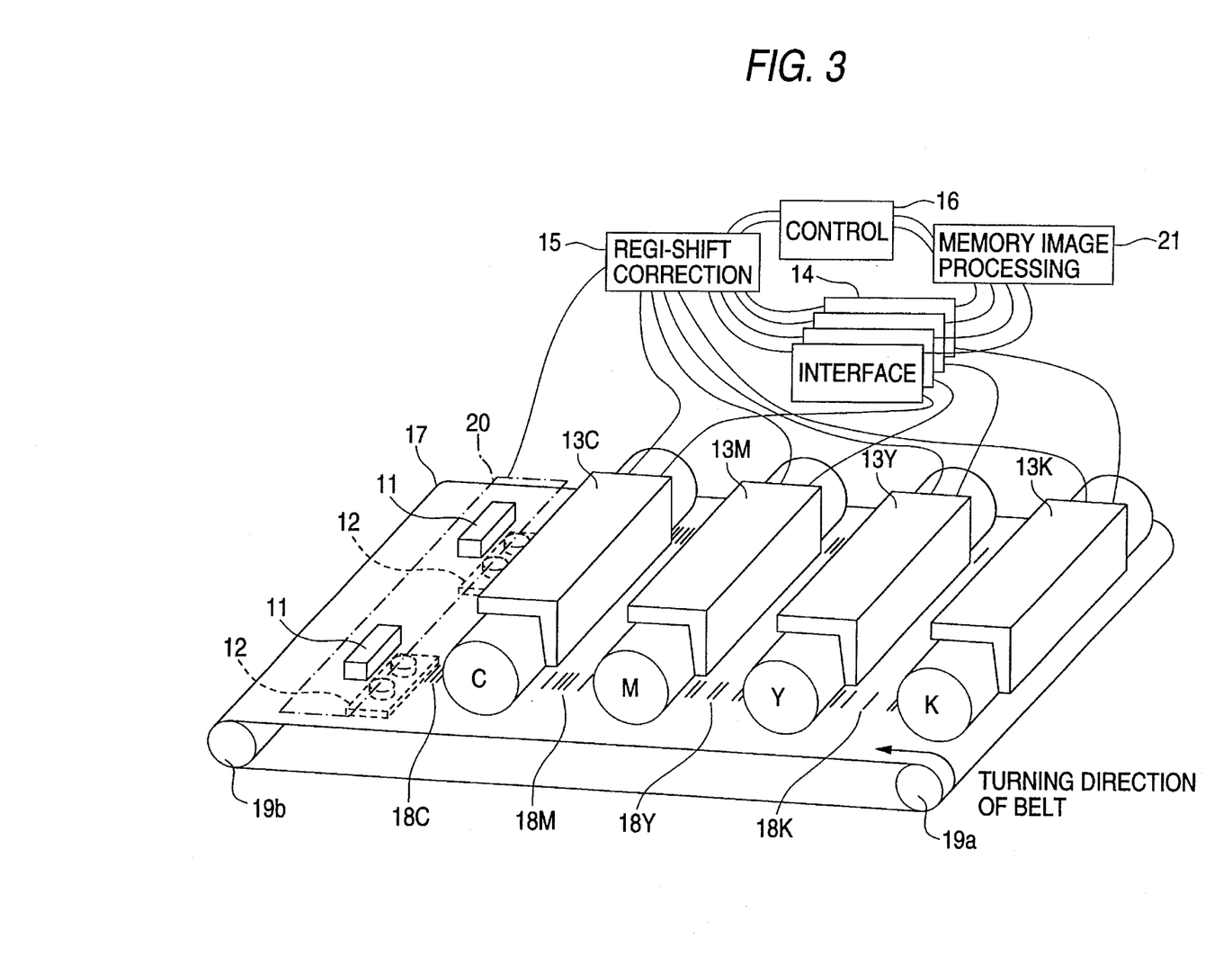
FIG. 3 is a constitutional perspective view showing the image sampling correction apparatus according to the present invention.
Figure 4:
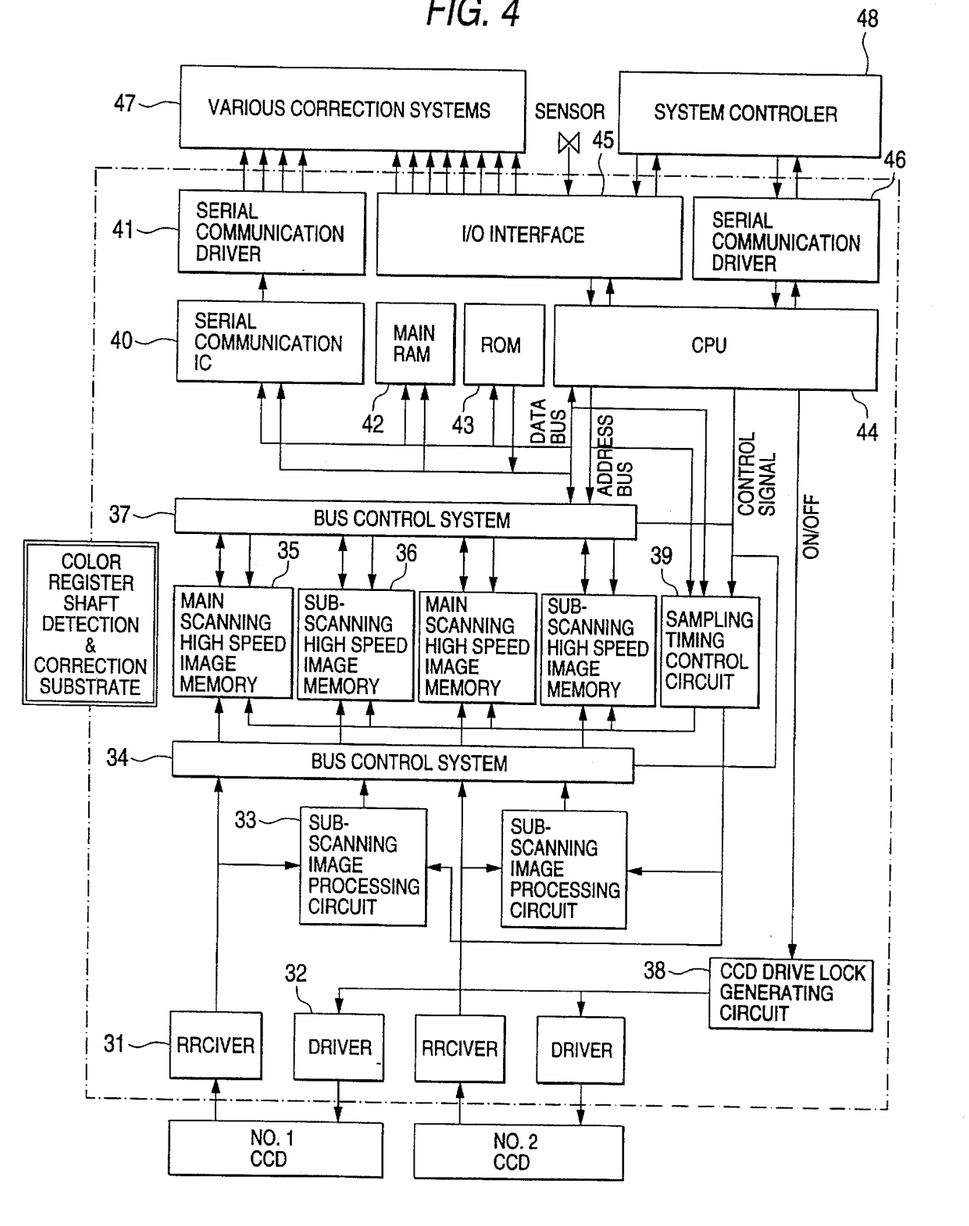
FIG. 4 is a block diagram showing a constitutional embodiment of the register shift correction board of FIG. 3.

FIG. 3 is a constitutional perspective view of the image sampling correction apparatus according to the present invention, and FIG. 4 is a block diagram showing a constitutional embodiment of the register shift correction board of FIG. 3. In FIG. 3, a CCD sensor 11 reads the transfer image formed on a transfer belt 17 by image forming units 13K, 13Y, 13M and 13C and is disposed on both sides of the largest paper area R. Thus, one CCD on each side, i.e., total two CCDs are disposed. A light source 12 is a light source for producing back-lighting required for detecting the image on the transfer belt 17. Any light source such as a LED or halogen lamp or the like that can ensure a sufficient amount of light as the light source of the CCD sensor 11 may be used as the light source 12. Further, the light source 12 can freely change the amount of light to ensure the most suitable state of image reception with respect to amount of light deterioration, permeability deterioration of the transfer belt 17, sensitivity deterioration of the CCD sensor 11, permeability deterioration due to contamination of an optical system or a change of environment such as a temperature change. The image forming units 13K, 13Y, 13M and 13C are respectively formed by a combination of a photoreceptor with a laser beam ROS or LED ROS, for example. The image forming units 13K, 13Y, 13M and 13C are respectively a unit for forming black images, a unit for forming yellow images, a unit for forming magenta images and a unit for forming cyan images, which are disposed with a substantially equal gap therebetween.

The transfer belt 17 has a transparent belt structure, which transfers images formed by the image forming units 13K, 13Y, 13M and 13C, and is supported by a drive roller 19a and a driven roller 19b that confronts the drive roller 19a. Further, the transfer belt 17 has an action to transport transferred paper, which is transported from right to left direction in the Figure, which is the same direction as the rotary direction of the belt. In a case of the transportation of the paper, the transfer belt 17 has an absorption corotron for absorption not shown to absorb the paper into the belt member.

The drive roller 19a is driven by an exclusive drive motor (not shown) having a superior constant velocity, and a driven roller 19b is rotated by the transfer belt 17 which transmits the driving force. As assay body 20 is formed by mounting the CCD sensor 11, drive circuit of the CCD sensor 11, an optical system, for example, cellhoc lens or the like. The arrangement relationship between these elements are designed so that high accuracy positioning can be easily attained.

Interface boards 14 are boards to transmit image signals to each ROS, a register shift correction board 15 is a board to execute detection, and processing of amount of register shift, and calculation and setting of corrected value or the like, and a control board 16 is a board to receive module for controlling each board and the entire apparatus. Further, an image processing board 21 is a board to receive module relating to a memory and an image processing.

A usual image forming mode will be described hereinbelow.

A paper transportation timing and an image write timing are determined so that when the top end of a paper transported by the transfer belt 17 reaches the transfer point just under the image forming unit 13K, the top end of the image formed by the image forming unit 13K reaches the transfer point just under the image forming unit 13K, namely, the image formed by the image forming unit 13K fits the sub-scanning direction between papers (paper transportation direction). To the paper that reached the transfer point is transferred the image formed by the image forming unit 13K using transfer corotron or the like not shown. Further, the transferred image reaches the transfer point just under the image forming unit 13Y. The paper that reached the transfer point just under the image forming unit 13Y is transferred by the same way as transferred by the image forming unit 13K. All papers that were transferred are transported by a belt and when the papers are near the driven roller 19b, they are stripped from the transfer belt 17 by a separation corotron or a stripper or the like not shown. After that, the papers are sealed by a sealing device or the like and discharged from the transfer unit.

The register shift correction system between respective colors will now be described. In the register shift correction, when a correction board 15 starts a printing operation by the command of a control board 16, it immediately starts preparing for sampling register shift measurement patterns. On the other hand, an interface board 14 outputs the image data of an image processing board 21 to an image forming unit to form images by the command of the control board 16. The register shift is executed by outputting the printed image in the synchronism with one print output of one job, for example, and at the same time entering an exclusive correction cycle preset in the apparatus. The interface boards 14 act as pattern generators which output register shift measurement patterns located outside the printed image. The register shift measurement patterns are respectively transmitted to the image forming units 13K, 13Y, 13M, and 13C, and patterns 18K, 18Y, 18M, and 18C are transferred onto the transfer belt 17.

As shown in FIG. 3, this correction system is set so that the register shift measurement patterns are transferred to positions on the transfer belt which pass under the CCD sensor 11. Sampling start timing and sampling finish timing, which are necessary and sufficient to sample the register shift measurement patterns, are indexed from the transfer timing in the respective interface board 14 and pitch from the transfer position to the CCD sensor 11 in the register shift board 15 which samples image data from the CCD sensor 11 to take image data.

When the register shift correction board 15 reaches sampling start timing, taking image data from the CCD sensor 11 into a high speed memory is started, and when it reaches sampling finish timing, taking the image data is finished. As soon as taking the image data is finished, a position of the image is decided by, for example, the method of elastic center or the like, from the taken image data by the time when the sampling of the subsequent sampling is finished. The decided image position is stored in a main memory as an image position address, for example. This operations is repeated several times, thereby obtaining some decided image position addresses for each image forming unit. In this case, those some decided image position addresses may be averaged for each image forming unit to increase the accuracy of the decided image position address.

Further, in the register shift correction board 15, correction values which correct register shifts between respective image forming units are calculated for some register shift parameters and for each image forming unit, by an algorithm predetermined from image position addresses decided for each image forming unit. The calculated correction values are directly or indirectly set to the image forming units or the interface boards from the register shift correction board 15, whereby correction is made.

The register shift correction board 15 is constructed, for example, as shown in FIG. 4. In the register shift correction board 15, a driver 32 drives a CCD sensor in accordance with the clock which is generated by a CCD drive clock generating circuit 38, and read image data of, for example, eight bits in a pixel unit and 256 gradation is received into a receiver 31 one after another. The image data relating to the main scanning is stored in a main scanning high speed image memory 35 through a bus control system 34. The image data relating to the sub-scanning is averaged by a sub-scanning image processing circuit 33 and stored in a sub-scanning high speed image memory 36 through the bus control system 34. A sampling timing control circuit 39 controls timing which receives image data in the sub-scanning image processing circuit 33, the main scanning high speed image memory 35 and the sub-scanning high speed image memory 36 in accordance with the sampling start timing and sampling period or the like set by a CPU 44. A main RAM 42 is used as a work area of the CPU 44, and a ROM 43 stores a control program of the CPU 44. A serial communication driver 41 transmits a control data such as a set parameter or the like from the CPU 44 to various correction systems 47. I/O interface 45 is located between the various correction systems 47 and the CPU, outputs an ON/OFF signal to the various correction systems 47, receives an ON/OFF signal as input from a sensor, and transmits or receives an ON/OFF signal between the CPU and a system controller 48. A serial communication driver 46 transmits or receives data between the CPU 44 and the system controller 48.

The CPU 44 controls the CCD drive clock generating circuit 38, the sampling timing control circuit 39, and the bus control systems 34 and 37 to receive image data of register shift measurement patterns output on the transfer belt, and decides image position addresses to calculate amount of register shift thereby controlling the various correction systems 47 through the serial communication IC 40 and the serial communication driver 41 or the I/O interface 45 and serial communication driver 46.

Figure 5:
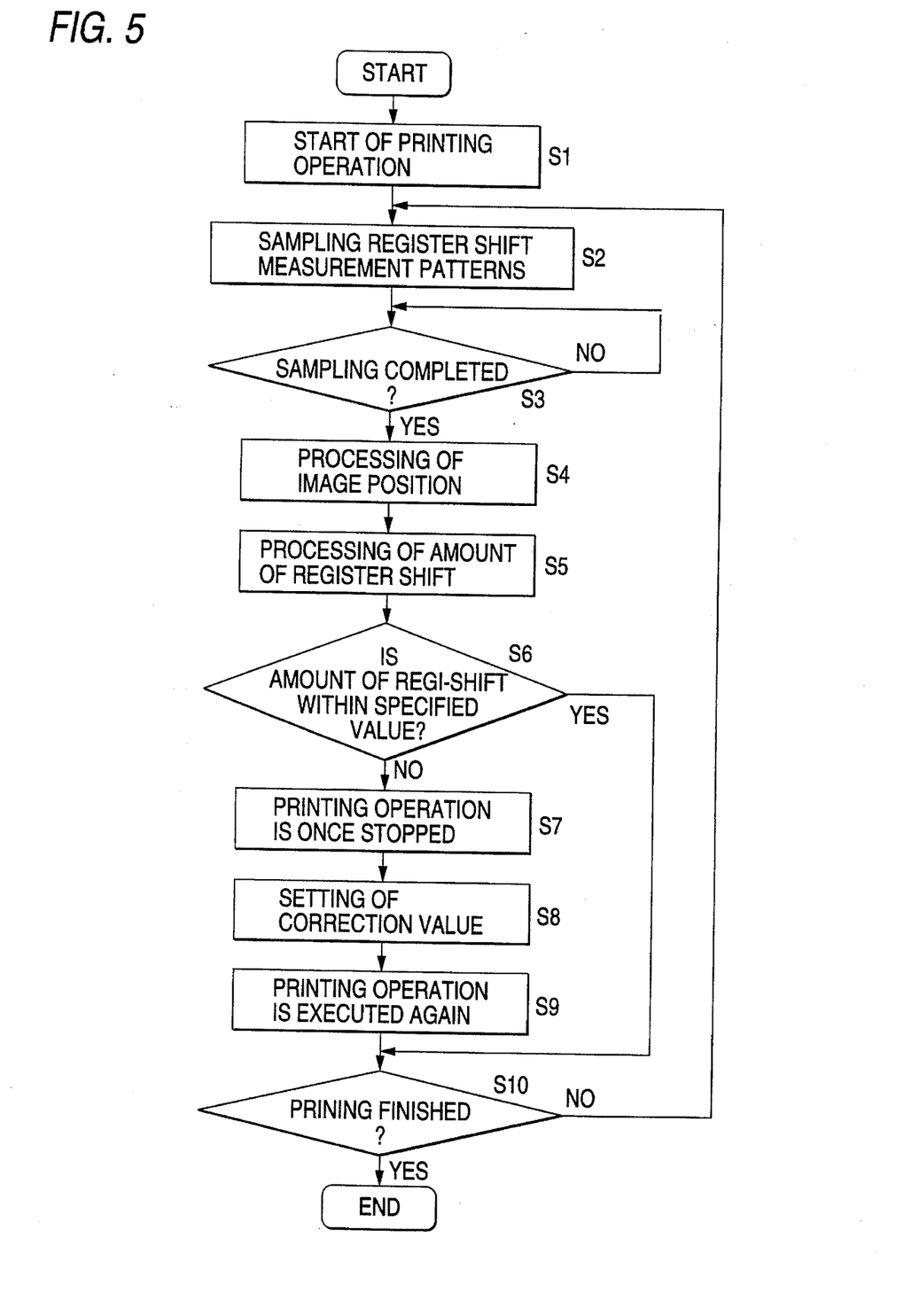
FIG. 5 is a flowchart explaining an operation of the register shift correction according to the present invention.
Figure 6:
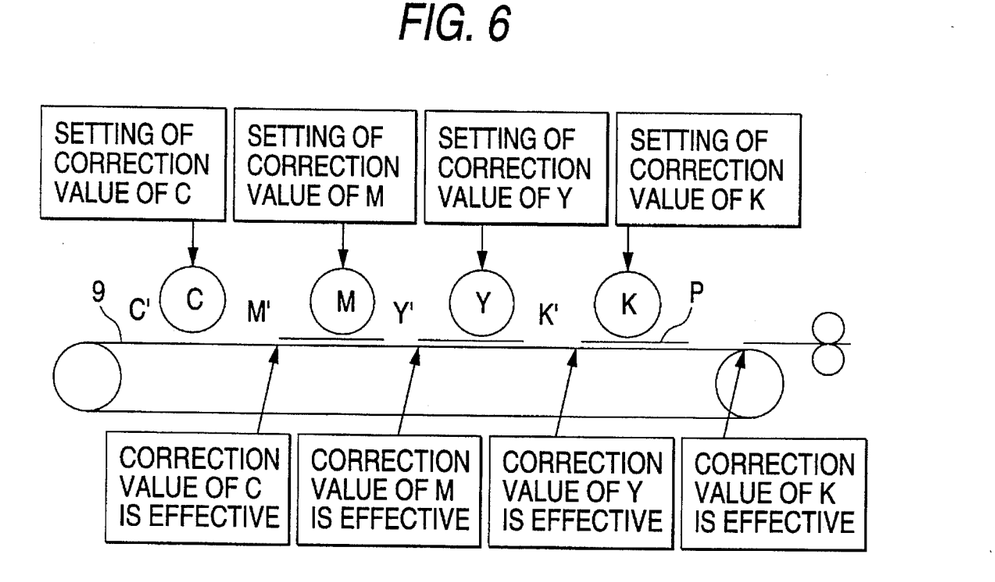
FIG. 6 is a constitutional view showing an image sampling and color shift correction system according to another embodiment of the present invention.

FIG. 5 is a flowchart explaining the processing of the register shift correction according to the present invention. As shown in FIG. 5, when a printing operation is started (step S1), register shift measurement patterns for respective colors are sampled (step S2). After completion of the sampling (step S3), the processing of image positions of various colors are executed (step S4). After the processing of the image position is completed (step S5), the processing of amount of register shift is executed (step S5). This processing is always carried out during a printing operation, and is executed every a constant reference amount such as one turning of the belt or the like. Accordingly, the amount of register shift is determined by an average of the data obtained by sampling the register shift measurement patterns for a constant reference amount such as one turning of the belt. Then, it is judged whether the amount of register shift is within the range of specified values (step S6). If the amount of register shift is within a permissible range, step S6 advances to step S10. If the amount of register shift is not within a permissible range, the printing operation is once stopped (step S7) and a correction value is set. After that, a printing operation is started again by auto start function thereby continuing the remaining printing operation (steps S8 to S10).

FIGS. 6 to 8B show other embodiments according to the present invention. When the amount of register shift is out of the range of reference values, the printing operation is once stopped and a correction value is immediately set in the above-mentioned embodiment. However, when in the embodiment shown in FIG. 6, images are transferred in multiple to a paper P which is transported on the transfer belt 9, by respective image forming units K, Y, M, and C, a correction value is set without stopping the printing operation, so that respective correction values become effective in K', Y', M', and C' which are the areas between the respective image forming units K, Y, M, and C. Therefore, the amount of register shift can always be corrected to the most suitable state during the printing operation. However, in this case, the correction values of respective colors are simultaneously set. Accordingly, areas in which the correction values become effective are differentiated from the respective colors, and only a specific color is shifted, thereby resulting in rather largely color shifted picture quality.

Figure 7:
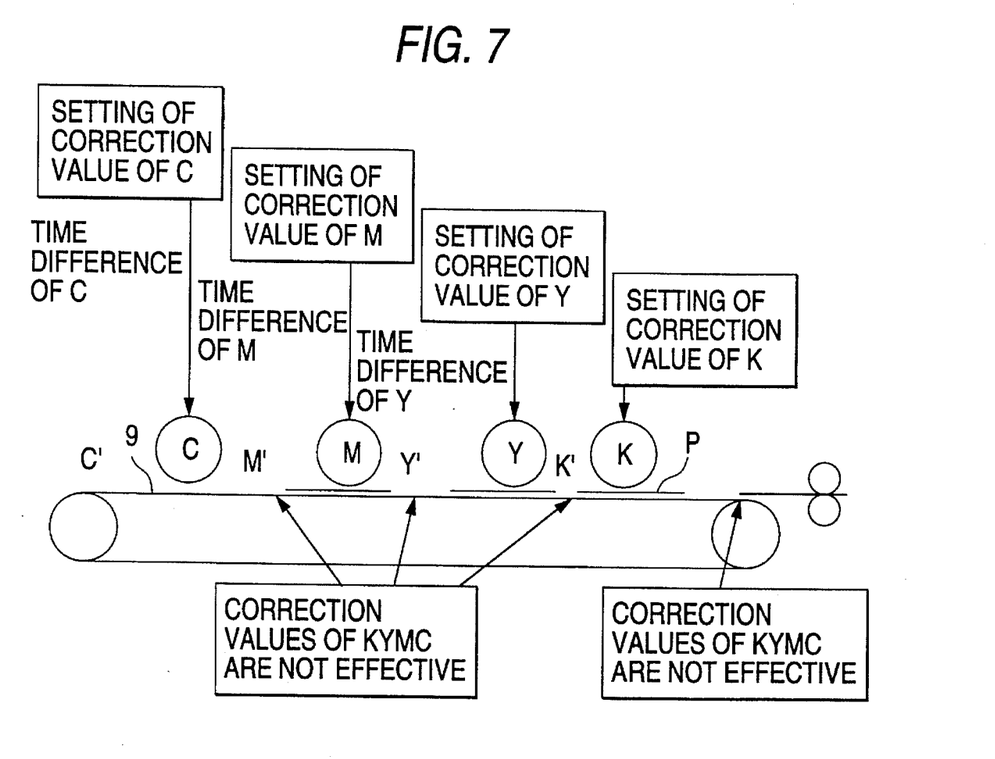
FIG. 7 is a constitutional view showing an image sampling and color shift correction system according to still another embodiment of the present invention.

Thus, in the embodiment shown in FIG. 7, a time difference is provided at the correction value write timing in the respective image forming units K, Y, M, and C, so that setting of correction values for all colors is executed at the same area between the image forming unit for example, K', thereby preventing the shift of only the specific color.

Correction that will take a long time is not completed at an area between image forming units in the embodiment shown in FIG. 7. As a result, it is possible that a color register shift occurs at the top end of the next image. Therefore, time for correction is lengthened by skipping an image output by a required time at the correction or shifting the image output backward, and the color shift correction values may be set by using the lengthened time. Further, correction that requires little write time such as time for electrically rewriting a correction value may be completed between image forming units. On the other hand, correction that requires a long time, such as time for a mechanical correction, may skip or shift an image or may be made by using time for changing a manuscript or time between jobs. Additionally, the correction may be made by these combinations.

Figure 8A:
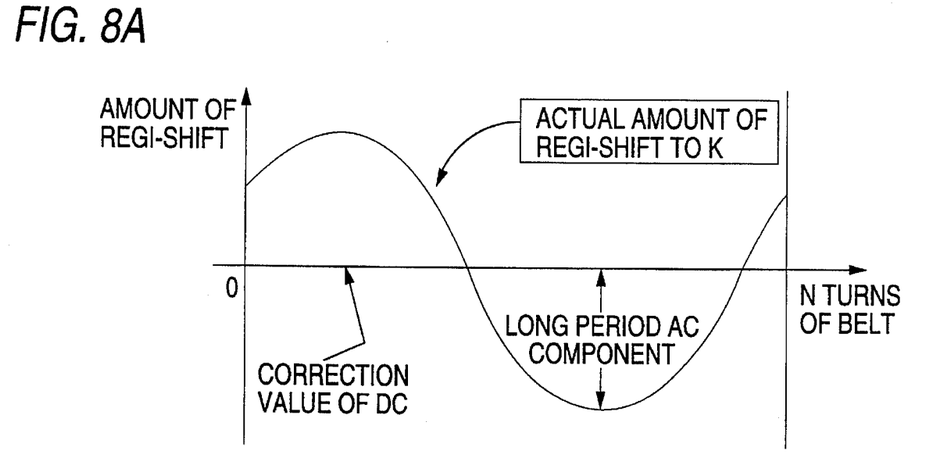
FIG. 8A is a graph explaining a long period oscillation component.

Another embodiment according to the present invention will now be described. In a case where a transfer belt is used, a long period AC oscillation component which is produced by a period longer than one turning of the belt, derived from a sidewalk of a belt (shift in the sub-scanning direction) or the like causes a problem. Namely, a color has a regi-curve (a shift of a reference color k from other colors, which is caused by a shift in the sub-scanning direction by something such as the belt) for a color K, with respect to N turns of a transfer belt as shown in FIG. 8A. In this case, when the correction value is set in accordance with a DC component, a long period AC component appears as a color shift component as it is.

Figure 8B:
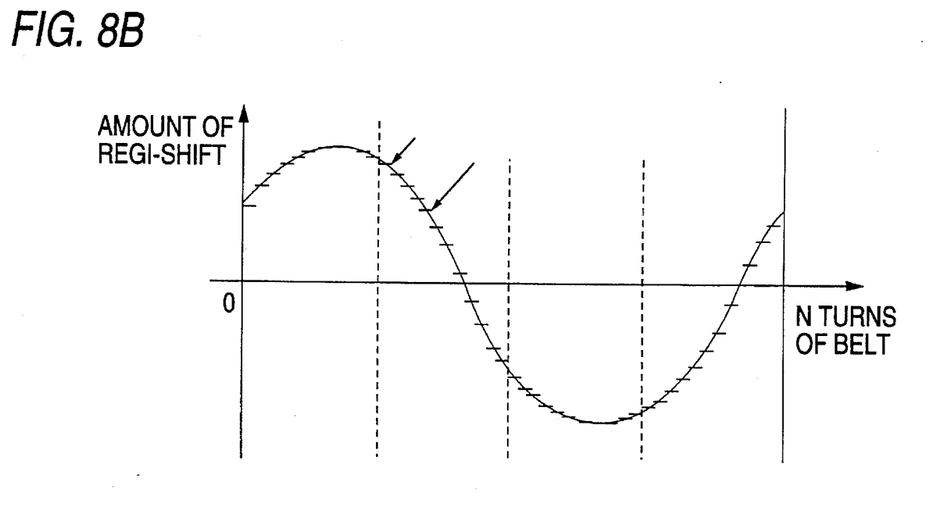
FIG. 8B is a graph showing a long period oscillation component according to another embodiment of the present invention.

Therefore, the long period AC component which is produced by a period longer than one turning of the transfer belt is detected and natural oscillation characteristics are stored. A method of detecting the component may be carried out in the color shift cycle, or in a specific service mode, or in a printing operation in which the register shift measurement patterns are written in the outside of the largest paper area. The register shift correction values are subdivided by respective papers or N turnings of the belt as shown in FIG. 8B. The most suitable correction value is calculated by determining that the detected long period AC component exists in a certain phase in the subdivided areas at present, and determining how much the change of the correction value is estimated, thereby setting correction data in which the long period AC component is taken into consideration.

Further, an inclination of change due to the long period AC component is estimated from, for example, a result obtained by sampling along one turning of the belt, a result obtained by sampling the preceding one turning of the belt, and a result obtained by further preceding one turning of the belt. The estimated value is added to a value to be set. In this case, color shift can be reduced to a half level by setting the estimated value to be added to a half of the color shift estimated value at the next time of correction, with the result that, it can be prevented that the long period AC oscillation component appears as a color shift component as it is. As a result, the period of the color shift correction cycle can be lengthened by improvement of a color shifted picture quality. In other words, the printing productivity can be increased.

As described above, according to the present invention, even in a usual job cycle, a sampling operation can be executed at all times to correct the register shift correction while executing the job. As a result, the following advantages can be obtained.

1) A specific cycle relating to a sampling, processing and correction to correct color register shift correction is not required and a specific cycle time to correct color register shift correction can be remarkably shortened.

2) A color regi-adjustment (a color register shift correction) can be made at a substantially real time and the best picture quality can be maintained at all times.

3) Since the amount of register shift can be monitored at all times, to monitor the change of conditions under which the register shift occurs, such as temperature or the like is not required.

4) A color regi-adjustment (a color register shift correction) can be made at a substantially real time to an external force which a conventional machine cannot detect, such as the change of a state of a floor or impact against a machine.

5) Even a long period AC component depending on N turns of belt, that has not been conventionally corrected, can be corrected.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image sampling and color shift correction system in a multiple image forming apparatus for forming a multiple image by providing a plurality of image output means along a transfer belt, said system comprising:

image control means which applies image data to respective said image output means for controlling image formation;

pattern generator means for repeatedly generating a register shift measurement pattern in a main scanning direction and a sub-scanning direction of said respective image output means, the register shift measurement pattern being formed outside the largest paper area;

sampling means for sampling an image formed by said respective image output means at both sides of a paper area on the transfer belt in the main scanning direction of the transfer belt;

processing means which takes data sampled by said sampling means for processing an amount of register shift; and control means for controlling the image output means and the image sampling means to execute a correction operation in an area between a same one pair of the plurality of image output means.

2. An image sampling and color shift correction system according to claim 1, wherein a sampling is executed based upon a constant amount of turns of a transfer belt during a printing operation.

3. An image sampling and color shift correction system according to claim 1, wherein when the amount of the register shift is outside of a specified range, the printing operation is stopped to execute a correction operation.

4. An image sampling and color shift correction system according to claim 3, wherein after the correction operation is finished, the printing operation is automatically continued.

5. An image sampling and color shift correction system in a multiple image forming apparatus for forming a multiple image by providing a plurality of image output means along a transfer belt, said system comprising:

image control means which applies image data to respective said image output means for controlling image formation;

pattern generator means for repeatedly generating a register shift measurement pattern in a main scanning direction and a sub-scanning direction of respective said image output means, the register shift measurement pattern being formed outside the largest paper area;

sampling means for sampling an image formed by said respective image output means at both sides of a paper area on the transfer belt in the main scanning direction of the transfer belt;

processing means which takes data sampled by said sampling means for processing an amount of register shift; and control means for controlling the image output means and the image sampling means to set a time delay for a correction value write timing operation in respective ones of the plurality of image output means, and to execute a correction operation for all colors in an area between a same one pair of the plurality of image output means.

6. An image sampling and color shift correction system according to claim 5, wherein a sampling is executed based upon a constant amount of turns of a transfer belt during a printing operation.

7. An image sampling and color shift correction system according to claim 5, wherein when the amount of the register shift is outside of a specified range, the printing operation is stopped to execute a correction operation.

8. An image sampling and color shift correction system according to claim 7, wherein after the correction operation is finished, the printing operation is automatically continued.

9. An image sampling and color shift correction system in a multiple image forming apparatus for forming a multiple image by providing a plurality of image output means along a transfer belt, said system comprising:

image control means which applies image data to respective said image output means for controlling image formation;

pattern generator means for repeatedly generating a register shift measurement pattern in a main scanning direction and a sub-scanning direction of said respective image output means, the register shift measurement pattern being formed outside the largest paper area;

sampling means for sampling an image formed by said respective image output means at both sides of a paper area on the transfer belt in the main scanning direction of the transfer belt;

processing means which takes data sampled by said sampling means for processing an amount of register shift; and control means for controlling the image output means and the image sampling means to set a time delay for a correction value write timing operation in respective ones of the plurality of image output means, and to execute a correction operation by skipping an image output means by a required time at the time of correction, thereby executing the correction operation.

10. An image sampling and color shift correction system according to claim 9, wherein a sampling is executed based upon, a constant amount of turns of a transfer belt during a printing operation.

11. An image sampling and color shift correction system according to claim 9, wherein when the amount of the register shift is outside of a specified range, the printing operation is stopped to execute a correction operation.

12. An image sampling and color shift correction system according to claim 11, wherein after the correction operation is finished the printing operation is automatically continued.

13. An image sampling and color shift correction system in a multiple image forming apparatus for forming a multiple image by providing a plurality of image output means along a transfer belt, said system comprising:

image control means which applies image data to respective said image output means for controlling image formation;

pattern generator means for repeatedly generating a register shift measurement pattern in a main scanning direction and a sub-scanning direction of said respective image output means, the register shift measurement pattern being formed outside the largest paper area;

sampling means for sampling an image formed by said respective image output means at both sides of a paper area on the transfer belt in the main scanning direction of the transfer belt;

processing means which takes data sampled by said sampling means for processing an amount of register shift; and control means for controlling the image output means and the image sampling means to set a time delay for a correction value write timing operation in respective ones of the plurality of image output means, and to execute a correction operation by backward shifting at least one of the image output means.

14. An image sampling and color shift correction system according to claim 13, wherein a sampling is executed based upon a constant amount of turns of a transfer belt during a printing operation.

15. An image sampling and color shift correction system according to claim 13, wherein when the amount of the register shift is outside of a specified range, the printing operation is stopped to execute a correction operation.

16. An image sampling and color shift correction system according to claim 15, wherein after the correction operation is finished, the printing operation is automatically continued.

17. An image sampling and color shift correction system in a multiple image forming apparatus for forming a multiple image by providing a plurality of image output means along a transfer belt, said system comprising:

image control means which applies image data to respective said image output means for controlling image formation;

pattern generator means for repeatedly generating a register shift measurement pattern in a main scanning direction and a sub-scanning direction of said respective image output means, the register shift measurement pattern being formed outside the largest paper area;

sampling means for sampling an image formed by said respective image output means at both sides of a paper area on the transfer belt in the main scanning direction of the transfer belt;

processing means which takes data sampled by said sampling means for processing an amount of register shift; and control means for controlling the image output means and the image sampling means to detect a long period oscillation component which is produced for a period longer than one turn of the transfer belt, the detected long period oscillation component being subdivided for respective papers and for short periods within one turn of the belt, and to execute a correction operation in accordance with the detected long period oscillation component.

18. An image sampling and color shift correction system according to claim 17, wherein a sampling is executed based upon a constant amount of turns of a transfer belt during a printing operation.

19. An image sampling and color shift correction system according to claim 17, wherein when the amount of the register shift is outside of a specified range, the printing operation is stopped to execute a correction operation.

20. An image sampling and color shift correction system according to claim 19, wherein after the correction operation is finished, the printing operation is automatically continued.

* * * * *

UNITED STATES PATENT AND TRADEMARK OFFICE
CERTIFICATE OF CORRECTION

PATENT NO. : 5,587,771
DATED : December 24, 1996
INVENTOR(S) : Hirotaka MORI et al.

It is certified that error appears in the above-indentified patent and that said Letters Patent is hereby corrected as shown below:

Claim 12, column 10, line 51, after "finished", insert --,--.

Signed and Sealed this

Tenth Day of June, 1997

Attest:

BRUCE LEHMAN

Attesting Officer

Commissioner of Patents and Trademarks